United States Patent
Jory

(10) Patent No.: US 10,555,400 B1
(45) Date of Patent: Feb. 4, 2020

(54) SHADE ELEMENTS AND METHODS FOR TWIST-LOCK LIGHTING CONTROLLERS

(71) Applicant: Synapse Wireless, Inc., Huntsville, AL (US)

(72) Inventor: Edward Jory, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 0 days.

(21) Appl. No.: 16/405,603

(22) Filed: May 7, 2019

(51) Int. Cl.
| | |
|---|---|
| F21V 21/00 | (2006.01) |
| H05B 37/02 | (2006.01) |
| F21V 23/00 | (2015.01) |
| F21V 23/04 | (2006.01) |
| F21W 131/103 | (2006.01) |
| F21V 17/04 | (2006.01) |

(52) U.S. Cl.
CPC ....... *H05B 37/0218* (2013.01); *F21V 23/008* (2013.01); *F21V 23/0464* (2013.01); *F21V 17/04* (2013.01); *F21V 21/00* (2013.01); *F21V 23/0442* (2013.01); *F21W 2131/103* (2013.01); *H05B 37/0272* (2013.01)

(58) Field of Classification Search
CPC ...... F21V 23/0442; F21V 21/00; F21V 17/00; F21V 17/04; H05B 37/0272

USPC ............................................ 362/217.14, 382
See application file for complete search history.

(56) References Cited

U.S. PATENT DOCUMENTS

| | | |
|---|---|---|
| 5,941,632 A | 8/1999 | Wedell et al. |
| 6,483,470 B1 | 11/2002 | Hohnstein et al. |
| 7,369,056 B2 | 5/2008 | McCollough, Jr. |
| 2015/0124100 A1* | 5/2015 | McRory ................. H04N 7/185 348/151 |
| 2015/0264776 A1* | 9/2015 | Amarin et al. .... G06Q 10/0875 315/129 |
| 2018/0115751 A1 | 4/2018 | Noone |

* cited by examiner

*Primary Examiner* — Thuy V Tran
(74) *Attorney, Agent, or Firm* — Maynard Cooper & Gale, P.C.; Jon E. Holland

(57) ABSTRACT

A lighting system has a twist-lock lighting controller that is electrically coupled to at least one light source. The twist-lock lighting controller has a translucent cover in which an optical sensor is positioned to sense ambient light for controlling the light source. A shade element having a canopy is positioned on the twist-lock lighting controller such that the canopy blocks direct sunlight from entering the twist-lock lighting controller through the translucent cover, thereby significantly reducing operating temperatures within the twist-lock lighting controller.

19 Claims, 8 Drawing Sheets

SHADE ELEMENTS AND METHODS FOR TWIST-LOCK LIGHTING CONTROLLERS

RELATED ART

Light sources for illuminating outdoor areas, such as streets and parking lots, are often mounted on poles. In such environments, a lighting controller for controlling one or more light sources is typically implemented as twist-lock device that is also mounted on the pole near the light source, often at the top of the pole. Such a lighting controller often includes an optical sensor (e.g., a photodiode) that is used control the light source based on ambient light (e.g., sunlight). As an example, when the light detected by the optical sensor falls below a threshold, the lighting controller may be configured to turn on or increase the brightness of the light source, and when the light detected by the optical sensor rises above a threshold, the lighting controller may be configured to turn off or decrease the brightness of the light source.

Conventionally, analog circuitry has been used for the lighting controllers. Such analog circuitry, including an optical sensor, often resides within a translucent enclosure so that the optical sensor can sense ambient light. In order to obtain better functionality and more efficient control of light sources, the analog circuitry in many of these lighting controllers have been replaced with digital circuitry that includes wireless components for enabling wireless communication. Using wireless communication, it is possible to program the lighting controllers with more complex algorithms and to update those algorithms over time. As an example, some of the light sources in a parking lot may be controlled to turn on based on ambient light, as described above, whereas other light sources may be controlled to turn on based on other factors, such as time of day or whether a moving object has recently been sensed near the light sources. By controlling the light sources in a more efficient manner, the amount of energy consumed by the lighting system may be significantly decreased.

BRIEF DESCRIPTION OF THE DRAWINGS

The disclosure can be better understood with reference to the following drawings.

The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
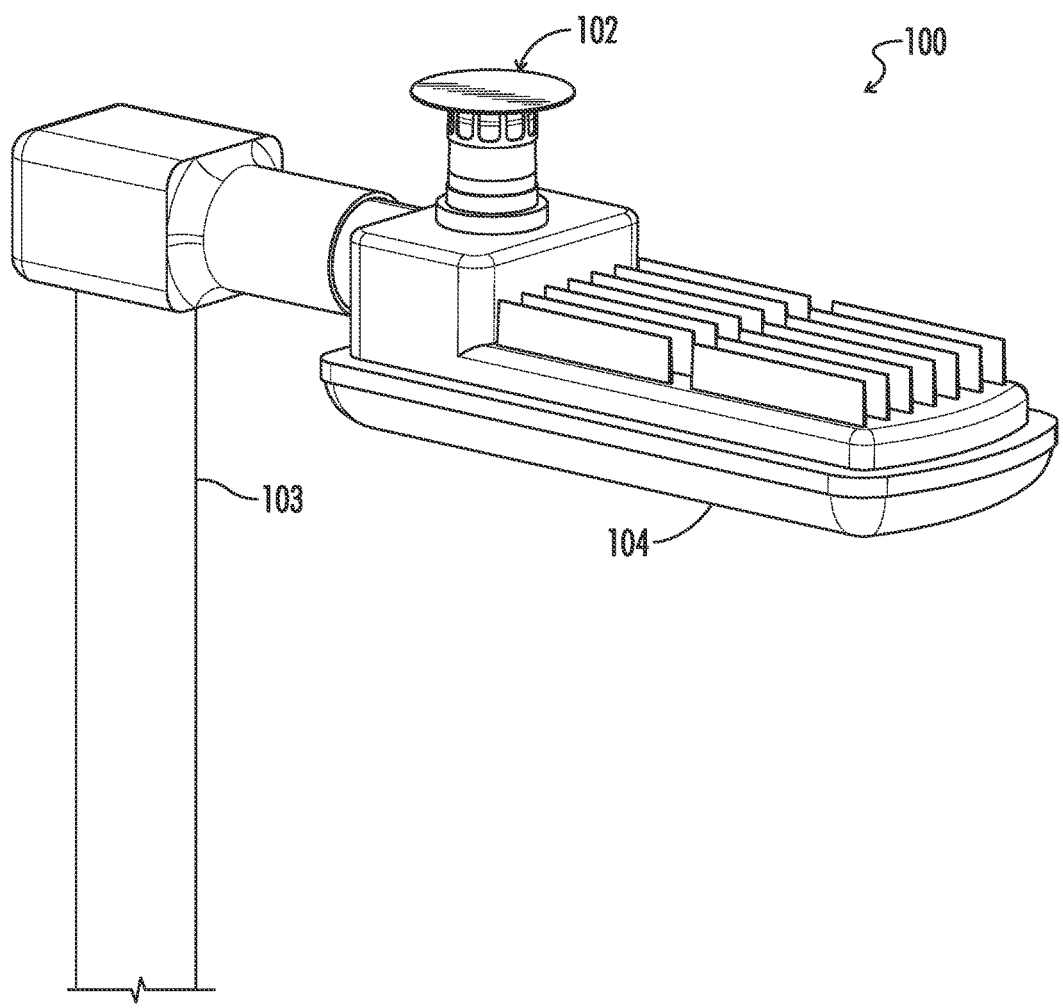
FIG. 1 depicts an exemplary embodiment of a lighting system that includes a lighting controller implemented as a twist-lock device.

The present disclosure generally relates to shade elements and methods for lighting controllers, particularly for lighting controllers implemented as twist-lock devices, referred to herein as "twist-lock lighting controllers." A lighting system in accordance with an embodiment of the present disclosure comprises a light source that is attached to a pole. A twist-lock lighting controller also attached to the pole includes an optical sensor enclosed within a cavity formed by a removable cover of the twist-lock lighting controller. The light source is configured to generate light for illuminating an area (e.g., a street, parking lot, or other area), and the twist-lock lighting controller is configured to control the light source. The lighting system further comprises a shade element with a canopy, mounted on the twist-lock lighting controller. The shade element may be positioned such that the canopy blocks direct sunlight (and in particular, UV radiation from the Sun) entering the cavity of the twist-lock device. Further, the shade element is positioned to have a gap between the twist-lock lighting controller and the canopy of the shade element. The gap between the shade element and the twist-lock lighting facilitates the flow of ambient air, helping to cool the lighting controller. By blocking sunlight without significantly impeding the flow of air around the twist-lock lighting controller, the temperature within the enclosure of the twist-lock lighting controller is lowered, thereby increasing the useful life of the circuitry of the twist-lock lighting controller.

In this regard, the analog circuitry of twist-lock lighting controllers used in the past has good resistance towards heat and hence good ability to withstand high temperatures. As indicated above, the analog circuitry in the twist-lock lighting controllers is being replaced with digital circuitry. Indeed, existing systems using twist-lock lighting controllers may be easily retrofitted with digital controllers to implement improved and more efficient control algorithms. In this regard, to replace a conventional analog twist-lock lighting controller with a digital one, the conventional controller may be twisted to unlock it from its mount and then removed. A digital twist-lock lighting controller may then be inserted into its place and twisted in order to lock the digital twist-lock lighting controller. However, the digital components of the new controller have relatively less resistance towards high temperature relative to analog components of conventional controllers. Thus, when some of the digital twist-lock lighting controllers are deployed under direct sunlight, components of the controllers may eventually fail sooner due to the increased temperature fluctuations caused by the sunlight. By using a shade element, as described herein, the extent of the temperature fluctuations may be reduced, thereby extending the useful lift of the digital components of the twist-lock lighting controller.

FIG. 1 depicts an exemplary embodiment of a lighting system 100 having a twist-lock lighting controller 102 for controlling one or more light sources 104. The lighting system 100 comprises a light pole 103 on which at least one light source 104 and a twist-lock lighting controller 102 are mounted. The light pole 103 is configured to support the light source 104, which is electrically coupled to the twist-lock lighting controller 105. In this regard, as will be described in more detail hereafter, the controller 102 may be similar to other conventional twist-lock devices that are configured to make both mechanical and electrical connections by inserting male components of the twist-lock device into a female base and twisting the twist-lock device relative to the base in order lock the twist-lock device. Similarly, the controller 102 may be removed from its female base by twisting the controller 102 in the opposite direction to unlock the controller 102 from its female base. In other embodiments, other types of lighting controllers may be used, and other techniques and configurations for making mechanical or electrical connections are possible.

The twist-lock lighting controller 102 may be programmatically configured to control the operation of the light source 104. In some embodiments, the lighting controller 102 includes digital circuitry (not shown in FIG. 1) for controlling the on/off state and brightness of the light source 104, though the controller 102 may include analog circuitry in lieu of or in addition to the digital circuitry. As an example, as will be described in more detail hereafter, the twist-lock controller 102 may include one or more digital processors and a wireless communication module for enabling wireless communication. Software algorithms for controlling the light source 104 may be wirelessly transmitted to the controller 102, which then executes the received software to perform one or more desired control algorithms. Exemplary techniques for enabling wireless communication and controlling light sources is described in commonly-assigned U.S. Pat. No. 9,374,874, entitled "Lighting Control Systems and Methods" and filed on Feb. 15, 2013, which is incorporated herein by reference.

The lighting system 100 deployed with the twist-lock lighting controller 102, as depicted by FIG. 1, may provide better control and operability of the system 100, relative to conventional lighting systems using less complex control algorithms. As an example, similar to conventional lighting systems, the lighting system 100 may have an optical sensor (not shown in FIG. 1) for detecting the intensity of ambient light, and the controller 102 may be configured to turn on or increase brightness of the light source 104 when the intensity of the ambient light falls below a threshold. Also, in such embodiments, the twist-lock lighting controller 102 may turn off or decrease the brightness of the light source 104 when the intensity of the ambient light detected rises above a threshold. The controller 102 may also be equipped with other sensors, such as a proximity sensor that detects movement of an object within a certain range of the sensor. In some embodiments, the controller 102 may be configured to turn on or increase the brightness of the light source only if the ambient light is below a threshold and the proximity sensor has detected movement within a certain time period. Hence, the system 100 may reduce energy consumption by only turning on or increasing the brightness of the light source 104 when a moving object is near the light source. If desired, the algorithm may be changed by wirelessly transmitting new instructions or code to the controller 102. In other embodiments, other control algorithms are possible.

Figure 2:
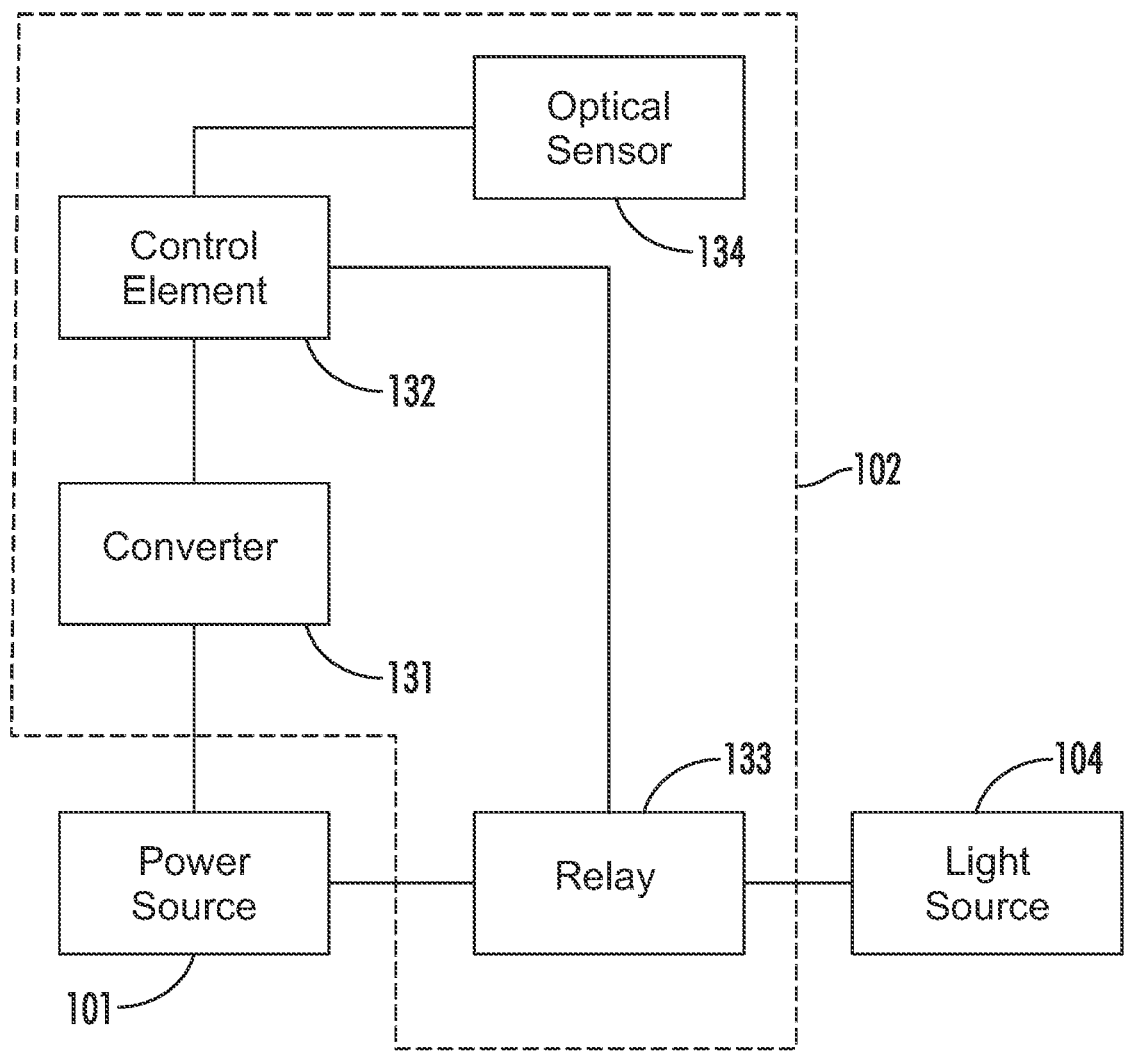
FIG. 2 is a block diagram depicting an exemplary embodiment of components of a lighting system, such as is depicted by FIG. 1.

The lighting system 100, as depicted in FIG. 2, comprises a power source 101 connected to a relay 133 and a converter 131. The power source 101 may be an external source, supplying an alternating current (AC). In other embodiments, the power source 101 may be a direct current (DC) supply (e.g., one or more batteries) and it is possible for the power source 101 to be internal to or integrated with the controller 102.

The converter 131 is configured to convert a power signal from the power source 101 to a suitable form for use by other components of the controller 102. As an example, the converter 131 may convert the power signal from AC to DC. Further, the converter 131 may adjust or regulate the voltage of the power signal so that it is compatible for use with other components of the controller 102, such as a control element 132. The control element 132 is configured to generally control the operation of the controller 102 and the light source 104, as will be described in more detail below.

The optical sensor 134 is configured to sense ambient light and provide a signal to the control element 132 indicative of the sensed light. The control element 132 is configured to send a control signal to a relay 133 for controlling the relay 133 based on the sensed light or other factors. The relay 133 is connected to the light source 104 and may be configured to selectively activate the light source 104 based on the control signal received from the control element 132. In this regard, to activate or turn on the light source 104, the relay 133 transitions to a closed state such that current from the power source 101 flows through the relay 133 to the light source 104. To deactivate or turn off the light source 104, the relay 133 transitions to a closed state such that current from the power source is prevented from flowing through the relay 133 to the light source 104. In other embodiments, the controller 102 may include other components for controlling the light source 104. As an example, the controller 102 may have a dimmer (not shown) that is configured to dim the brightness of the light source 104 to a desired level based on a control signal from the control element 132.

In the depicted embodiment, the optical sensor 134, the control element 132, the converter 131 and the relay 133 may be within a housing of the twist-lock lighting controller 102, as will be described in detail below. In some embodiments, the lighting system 100 may include one or more sensors (e.g., occupancy sensor or other type of sensor) to perform other functions, as may be desired. In other embodiments, other configurations of the lighting system 100 are possible.

Figure 3:
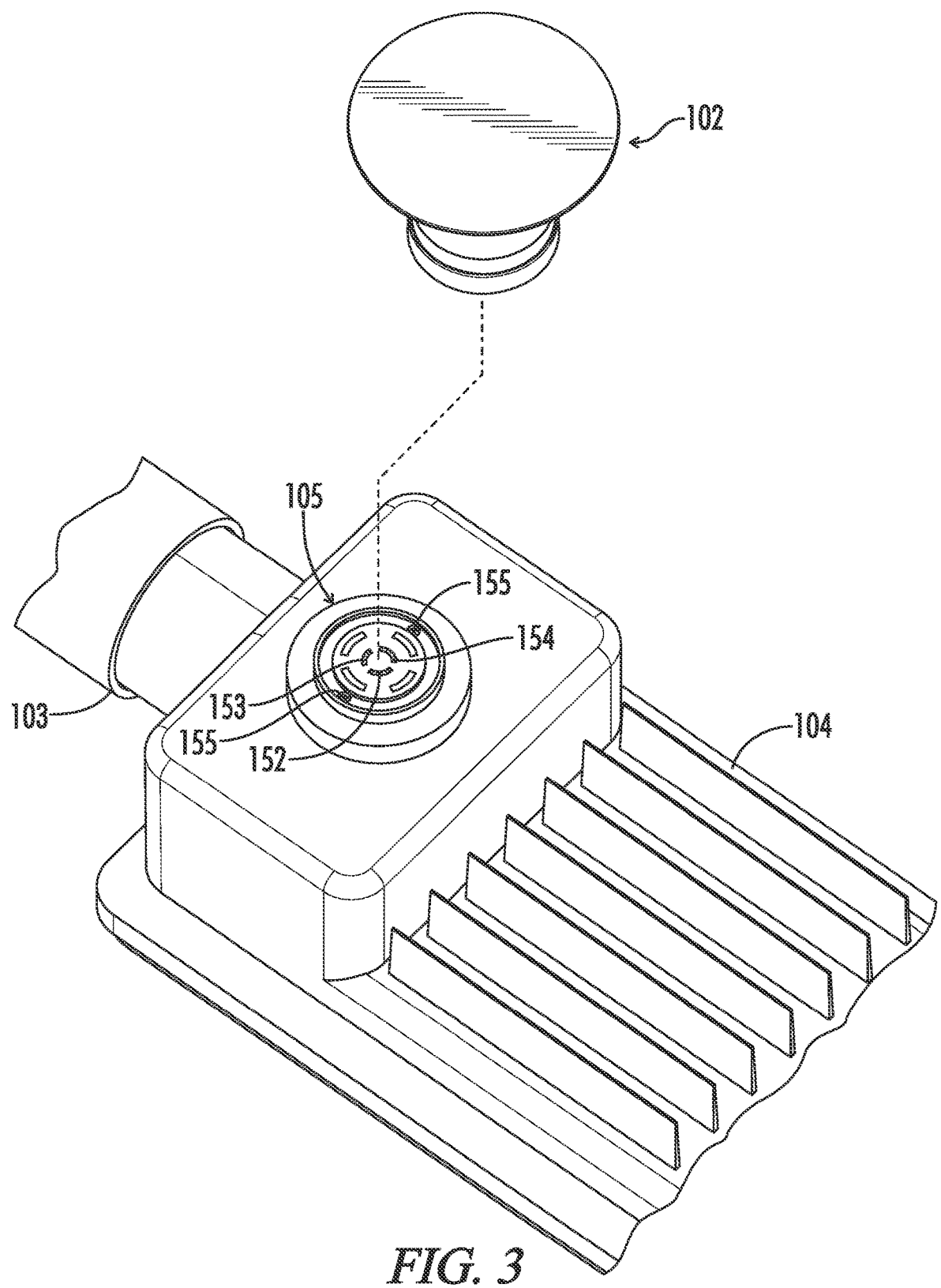
FIG. 3 depicts an exemplary embodiment of a twist-lock base mounted to a pole of a lighting system, such as is depicted by FIG. 1.
Figure 7:
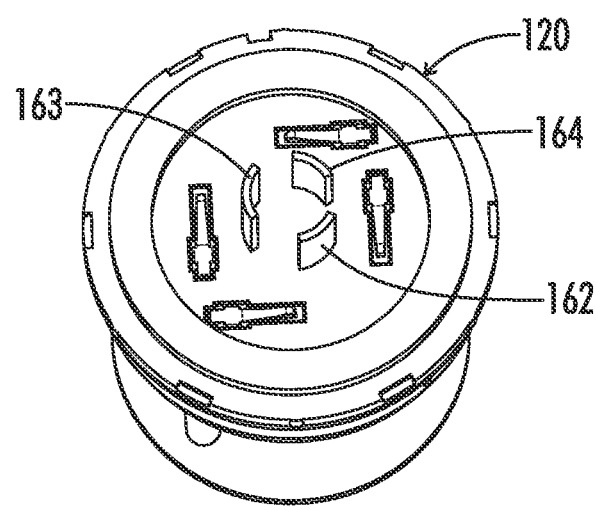
FIG. 7 depicts a bottom view of an exemplary embodiment of a lighting controller, such as is depicted by FIG. 6.

FIG. 3 depicts the top of the pole 103 with a female twist-lock base 105 mounted to the pole 103. The base 105 is configured to interface with and hold the twist-lock lighting controller 102 and provides connection between the twist-lock lighting controller 102 and the external power source 101 (FIG. 2). The base 105 has a plurality of slots 152-154 for receiving conductive prongs 162-164 (FIG. 7), respectively, of the twist-lock lighting controller 102.

The slots 152-154 are sized and arranged to provide electrical and mechanical connection for the twist-lock lighting controller 102. In this regard, the prongs 162-164 of the twist-lock lighting controller 102 may be inserted into the slots 152-154, respectively, and the controller 102 may then be twisted such that the prongs 162-164 are rotated relative to the base 105 in order to lock the controller 102 with the base 105. By twisting the controller 102 in the opposite direction so that the prongs 162-164 are rotated in the opposite direction relative to the base 105, the controller 102 may be unlocked such that the controller 102 may be pulled from the base 105 causing the prongs 162-164 to exit the slots 152-154. Moreover, conventional designs of known twist-lock devices may be used to implement the locking features described above.

Further, the base 105 includes one or more slots 155 to facilitate mechanical coupling of the base 105 to the pole 103. In the depicted embodiment, the base 105 may be coupled to the pole 103 using a screw inserted through the slot 155 and into the pole 103. In some embodiments, the base 105 may be coupled to a light fixture. In other embodiments, other configurations of the base 105 with other types of coupling mechanisms are possible.

Figure 4:
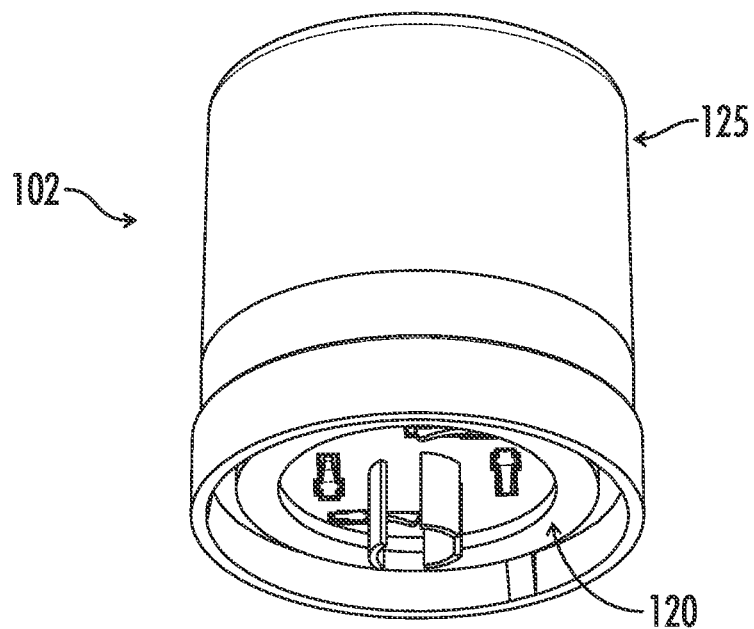
FIG. 4 depicts a three-dimensional perspective view of an exemplary embodiment of a lighting controller, such as is depicted by FIG. 1.
Figure 5:
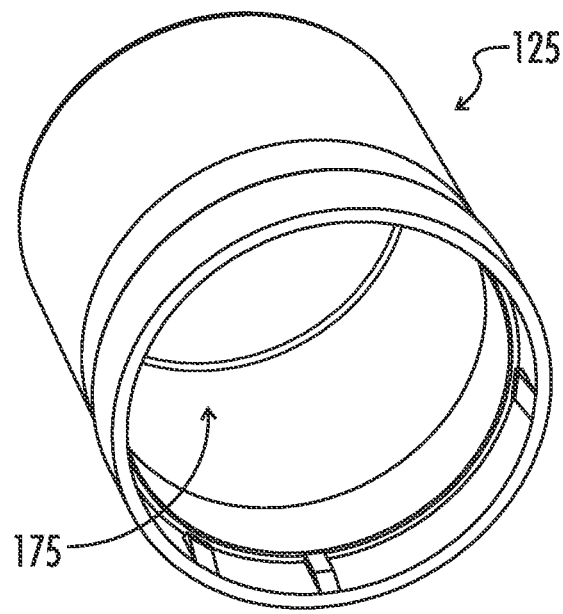
FIG. 5 depicts an exemplary embodiment of a cover for a lighting controller, such as is depicted by FIG. 4.

FIG. 4 depicts a three dimensional perspective view of the twist-lock lighting controller 102. The twist-lock lighting controller 102 has a housing that includes a base 120 and a cover 125 that is removable from the base 120. The cover 125 is configured to provide enclosure to circuitry, such as the converter 131, control element 132, optical sensor 134, and relay 133 of FIG. 2, that are mounted on the base 120. In this regard, the cover 125 forms a cavity 175 in which the circuitry resides when the cover 125 is attached to the base 120. In other embodiments, other arrangements of the twist-lock lighting controller 102 are possible.

Further, in the depicted embodiment, the cover 125 may be entirely translucent to allow light to pass through the cover 125 and reach the optical sensor 134 that is positioned within the cover 125. In some embodiments, the cover 125 may be fully transparent to one or more wavelengths of light or alternatively may be shaded to block at least some ambient light (e.g., sunlight) from passing into the cavity 175 formed by the cover 125. In other embodiments, other types of housings are possible.

Figure 6:
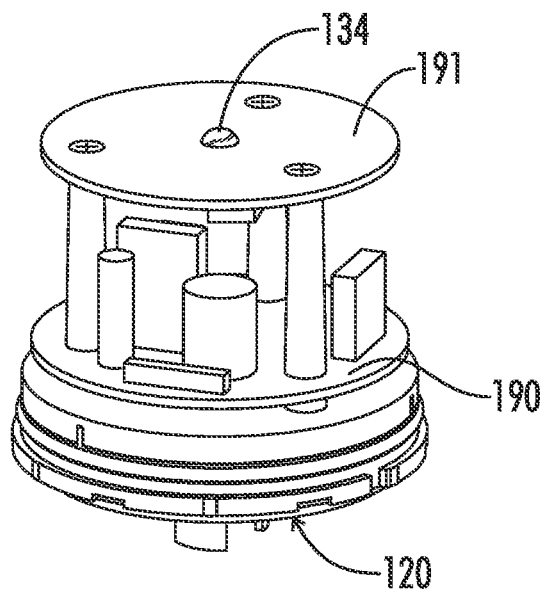
FIG. 6 depicts a three-dimensional perspective view of an exemplary embodiment of a lighting controller, such as is depicted by the FIG. 4.

The circuitry of the controller 102, as depicted by FIG. 6, is positioned on a lower printed circuit board (PCB) 190 and an upper PCB 191. In the exemplary embodiment shown by FIG. 6, the converter 131, the control element 132, and the relay 133 are positioned on the lower PCB 190, and the optical sensor 134 is positioned on the upper PCB 191. However, other configurations and arrangements of the components of the controller 102 are possible in other embodiments.

Figure 8:
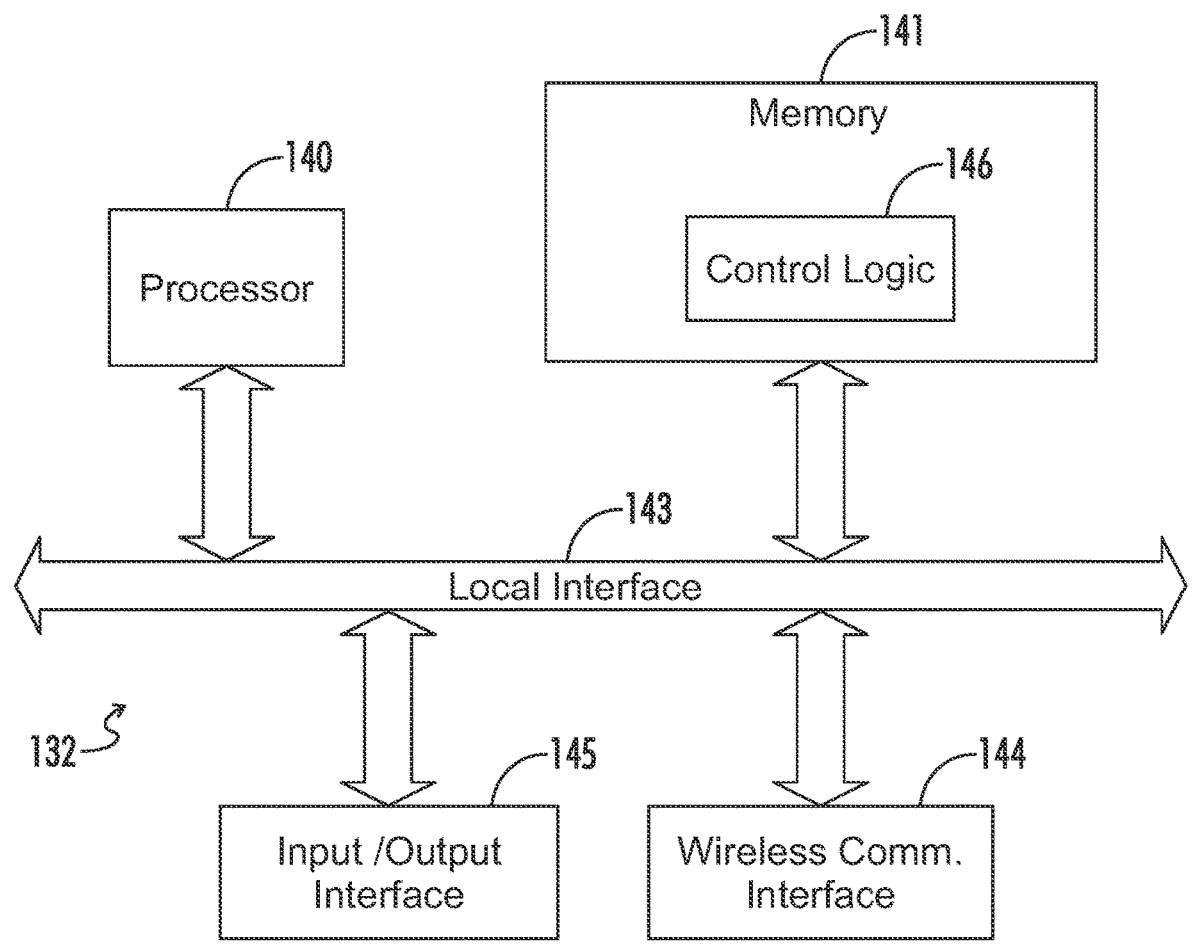
FIG. 8 is a block diagram depicting an exemplary embodiment of a lighting controller, such as is depicted by FIG. 6.

An exemplary embodiment of the control element 132, as depicted by FIG. 8, includes at least one conventional processor 140, which comprises processing hardware for executing instructions stored in memory 141. As an example, the processor 140 may comprise a central processing unit (CPU) or a digital signal processor (DSP).

The processor 141 communicates to and drives other elements within the control element 132 via a local interface 143, which can include at least one bus. The control element 132, further includes a wireless communication interface 144, which comprises an RF radio or other wireless communication device for communicating wirelessly per one or more protocols. Further, an input/output interface 145 may be configured to receive input signals or send output signals with other components of the controller 102, such as the relay 133, the converter 131, and the optical sensor 134.

The control element 132 comprises logic 146, referred to hereafter as "control logic" 146, which may be implemented in software, firmware, hardware, or any combination thereof. The control logic 146 may be configured to control the operation of the control element 132. Further, the control logic 146 may be configured to control the relay 133, in particular, according to a desired algorithm. In the exemplary embodiment shown by FIG. 8, the control logic 146 is implemented in software and stored in memory 141. However, in other embodiments, the control logic 146 may be implemented in hardware or a combination of hardware and software.

Note that the control logic 146 when implemented in software, can be stored and transported on any computer-readable medium for use by or in connection with an instruction execution apparatus that can fetch and execute instructions. In the context of this document, a "computer-readable medium" can be any means that can contain or store code for use by or in connection with the instruction execution apparatus.

Figure 9:
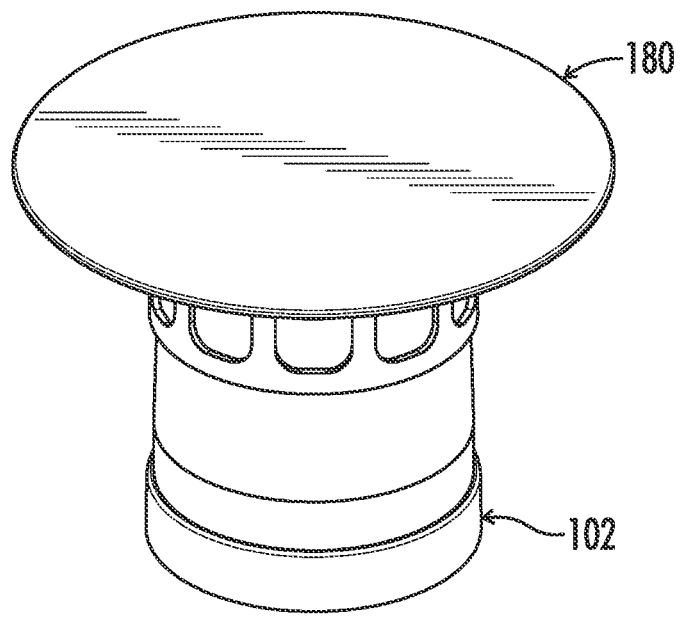
FIG. 9 depicts a three-dimensional perspective view of an exemplary embodiment of a shade element mounted on a lighting controller, such as is depicted by FIG. 6.
Figure 10:
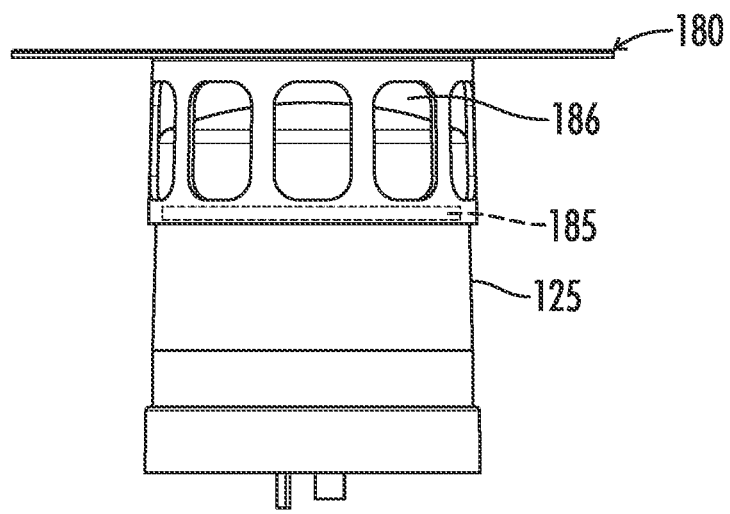
FIG. 10 depicts a front view of the shade element mounted onto the lighting controller depicted by FIG. 9.

FIG. 9 and FIG. 10 depict a three-dimensional perspective view and a front view of an exemplary embodiment of a shade element 180 mounted on the twist-lock lighting controller 102. The shade element 180 may be configured to shade the controller 102, thereby blocking direct sunlight from entering the cavity 175. By blocking sunlight, the shade element 180 prevents at least some heat and in particular, ultra-violet (UV) rays directly from the Sun, to enter the cavity 175 of the controller 102. The shade element 180 may be mounted to the cover 125 and may be configured to sit on top of the controller 102, such that a gap 186 exists between the shade element 180 and the top of the cover 125. Note that indirect sunlight, such as sunlight that reflects from the surface of the earth, is permitted to enter the controller 102 through sides of the translucent cover 125 so that the optical sensor 134 inside of the cover 125 is able to detect an amount of ambient light around the controller 125, as described above.

Figure 11:
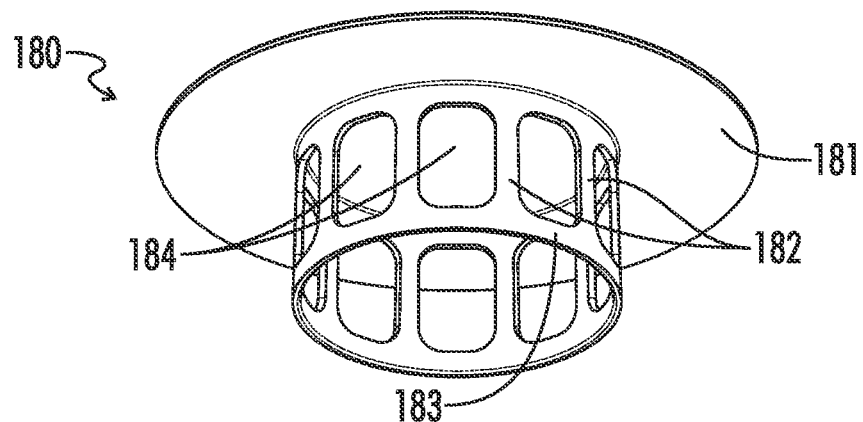
FIG. 11 depicts a three-dimensional perspective view of the shade element depicted by FIG. 9.
Figure 12:
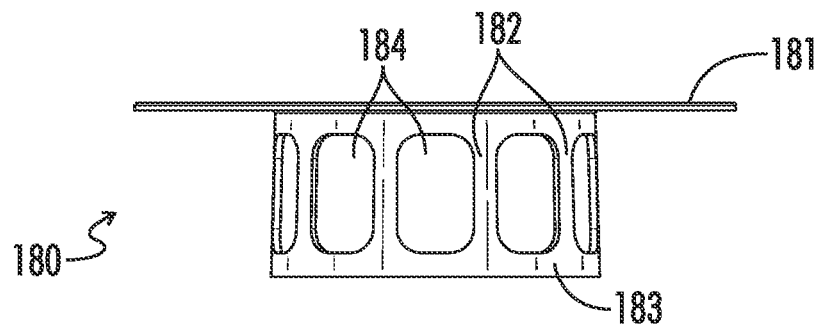
FIG. 12 depicts a front view of the shade element depicted by FIG. 11.

FIG. 11 and FIG. 12 depict a three-dimensional perspective view and a front view of the shade element 180. As depicted by FIGS. 11 and 12, the shade element 180 comprises a flat canopy 181 that is formed on a base 183 that is sized to fit snugly around the cover 125 to hold the shade element 180 on the cover 125. The base 183 has a plurality of holes 184 forming arms 182 in the base 183 that are separated by the holes 184. The presence of the holes 183 allows ambient air to pass through the holes 184 helping to cool the controller 102, and the holes 183 also allow indirect sunlight to pass through the holes 183 and enter the controller 102 through the top of the cover 125. In other embodiments, it is unnecessary for the canopy 181 to be flat, and other shapes of the canopy 181 and base 183 are possible.

As depicted by the FIG. 11 and FIG. 12, the canopy 181 is designed to completely shade the controller 102 from direct sunlight during the middle of the day, when the Sun is at or close to its highest point from the horizons (e.g., from about 10:00 a.m. to 2:00 p.m. local time). This time is likely the hottest part of the day when it is most desirable to block direct sunlight from entering the cover 125. In the depicted embodiment, the canopy 181 is circular, and the diameter of the canopy 181 is chosen to be wider than the width of the cover 125 such that the canopy 181 is able to shade the controller 102 from direct sunlight in the middle of the day. Further, in the depicted embodiment, the base 183 forms a circular ring, though other shapes of the canopy 181 and base 183 are possible.

In some embodiments, the shade element 180 may be integrated with the twist-lock lighting controller 102 as a single unit. As an example, the cover 125 may be made in the shape shown by FIGS. 9 and 10 such that the canopy 181 and base 183 are part of the cover 125. Indeed, the shade element 180 and cover 125 may be a unitary structure. In either embodiment, existing twist-lock controllers may be retrofitted to incorporate the shade element 180 described herein. As an example, if the shade element 180 is a separate component relative to the cover 125, then an existing twist-lock controller may be retrofitted with a shade element 180 by positioning the shade element 180 on the controller's cover 125, as shown by FIGS. 9 and 10. Alternatively, if the shade element 180 is integrated with the cover 125, the cover of the existing controller may be removed and replaced with the integrated cover and shade element.

In an exemplary embodiment, the shade element 180 may be coupled to the cover 125 of the controller 102, using adhesive tape 185 (FIG. 10), such as double-sided adhesive tape running along a circumference or perimeter of the base 183. In some embodiments, the diameter of the base 183 may be slightly tapered to facilitate a snug fit of the base 183 on the cover 125. In other embodiments, other dimensions of the shade element 180 and other techniques for coupling the shade element 180 to the controller 102 are possible.

In some embodiments, the shade element 180 is made of UV blocking material. As an example, the shade element 180 may be made of UV blocking plastic. Plastic may be a desirable material due to its low cost of manufacturing and desirable thermal properties. In this regard, the thermal conductivity of plastic is relatively low helping to prevent heat from the blocked sunlight from reaching the controller 102. In other embodiments, the shade element 180 may be made of other materials. In some embodiments, the shade element 180 may be substantially transparent except for blocking light in the UV spectrum. It is also possible for the canopy 181 to be opaque or near opaque.

Figure 13:
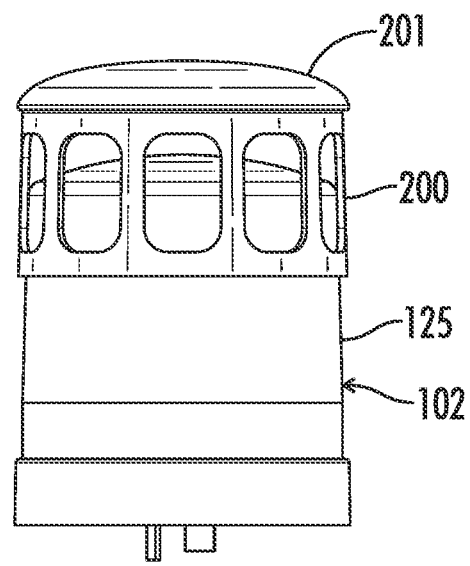
FIG. 13 depicts an exemplary embodiment of a shade element mounted on a lighting controller, such as is depicted by FIG. 6.

FIG. 13 depicts an exemplary embodiment of a shade element 200 mounted on the twist-lock lighting controller 102. The shade element 200 depicted by FIG. 13 is similar to the embodiment depicted by FIG. 9 except that the canopy 201 of the shade element 200 is curved (e.g., dome-shaped). Further, in such an embodiment, the diameter of the canopy 181 is similar to the width of the cover 125. In other embodiments, the shape of the canopy 201 may be different. As an example, it is possible for canopy to be triangular (e.g., shaped like a roof) where surfaces of the canopy are slanted. Yet other shapes and configurations of the shade element are possible in other embodiments. In addition, as indicated above, it is possible for the shade elements described herein to be used with lighting controllers that are not implemented as twist-lock devices.

Now, therefore, the following is claimed:

1. A lighting system, comprising:
   a pole;
   a light source mounted on the pole;
   a twist-lock lighting controller mounted on the pole and electrically coupled to the light source for controlling the light source, the twist-lock lighting controller having a translucent cover and an optical sensor positioned within the translucent cover for sensing ambient light that enters the twist-lock lighting controller through the translucent cover; and
   a shade element extending from the translucent cover, the shade element having a canopy that is positioned to block direct sunlight from entering the twist-lock lighting controller through the translucent cover.

2. The system of claim 1, wherein the shade element has a base mounted on the translucent cover between the canopy and the translucent cover such that a gap exists between the canopy and the translucent cover.

3. The system of claim 2, wherein the base has at least one hole through which ambient air and ambient light pass.

4. The system of claim 2, wherein the base fits snugly around the translucent cover.

5. The system of claim 1, wherein the shade element is integrated with the translucent cover.

6. The system of claim 1, wherein a width of the canopy is greater than a width of the translucent cover.

7. The system of claim 1, wherein the shade element is mounted on the translucent cover.

8. A lighting system, comprising:
   a light source;
   a twist-lock lighting controller electrically coupled to the light source for controlling the light source, the twist-lock lighting controller having a translucent cover and an optical sensor positioned within the translucent cover for sensing ambient light that enters the twist-lock lighting controller through the translucent cover; and
   a shade element formed on the twist-lock lighting controller, the shade element having a canopy that is positioned to block direct sunlight from entering the twist-lock lighting controller through the translucent cover.

9. The system of claim 8, wherein the shade element has a base mounted on the translucent cover between the canopy and the translucent cover such that a gap exists between the canopy and the translucent cover.

10. The system of claim 9, wherein the base has at least one hole through which ambient air and ambient light pass.

11. The system of claim 9, wherein the base fits snugly around the translucent cover.

12. The system of claim 8, wherein a width of the canopy is greater than a width of the translucent cover.

13. The system of claim 8, wherein the shade element is integrated with the translucent cover.

14. The system of claim 8, wherein the shade element is mounted on the translucent cover.

15. A method, comprising:
   positioning a shade element on a twist-lock lighting controller having a translucent cover and an optical sensor positioned within the translucent cover;
   blocking direct sunlight from entering the twist lock lighting controller through the translucent cover with a canopy of the shade element;
   receiving ambient light through the translucent cover;
   sensing the ambient light with the optical sensor; and
   controlling a light source with the twist-lock lighting controller based on the sensed ambient light.

16. The method of claim 15, wherein the positioning comprises mounting the shade element on the translucent cover.

17. The method of claim 15, wherein the shade element has a base that fits snugly around the translucent cover.

18. The method of claim 17, wherein the base has at least one hole through which ambient air and ambient light passes.

19. The method of claim 15, wherein a width of the canopy is greater than a width of the translucent cover.

* * * * *